United States Patent [19]

Beam et al.

[11] Patent Number: 4,772,077
[45] Date of Patent: Sep. 20, 1988

[54] CELL WITH PUSH BUTTON EJECTOR MECHANISM

[75] Inventors: J. Wade Beam, Princeton; Frederick J. Moriarty, Worcester; Edmund T. Paquette, Shrewsbury, all of Mass.

[73] Assignee: Wright Line Inc., Worcester, Mass.

[21] Appl. No.: 97,570

[22] Filed: Sep. 16, 1987

[51] Int. Cl.4 .................................................. A47B 81/06
[52] U.S. Cl. ........................................ 312/15; 206/387; 211/41; 312/13
[58] Field of Search ..................... 312/12, 13, 15, 18; 211/41; 206/387

[56] References Cited

U.S. PATENT DOCUMENTS

| | | | |
|---|---|---|---|
| 1,914,564 | 6/1933 | Grandjean | 211/40 X |
| 3,851,936 | 12/1974 | Muller | 312/111 |
| 3,866,990 | 2/1975 | McRae | 312/15 |
| 3,969,007 | 7/1976 | Lowry | 312/15 |
| 4,087,138 | 5/1978 | McRae | 312/15 |
| 4,121,877 | 10/1978 | Brown | 312/19 |
| 4,270,817 | 6/1981 | McRae | 312/15 |
| 4,577,914 | 3/1986 | Stravitz | 206/387 X |

FOREIGN PATENT DOCUMENTS

| | | | |
|---|---|---|---|
| 552132 | 11/1956 | Canada | 211/41 |
| 1216452 | 11/1958 | France | 211/41 |

Primary Examiner—Joseph Falk
Attorney, Agent, or Firm—Milton E. Gilbert; James W. Mitchell

[57] ABSTRACT

A storing and dispensing sytem for square or rectangular objects such as computer media cartridges and packages. The system includes a housing (10) forming a plurality of stalls (16), and an ejector (18) associated with each stall (16) and pivotally mounted in the housing (12) for dispensing the contents of the associated stall (16) upon manual actuation of the ejector (18).

3 Claims, 4 Drawing Sheets

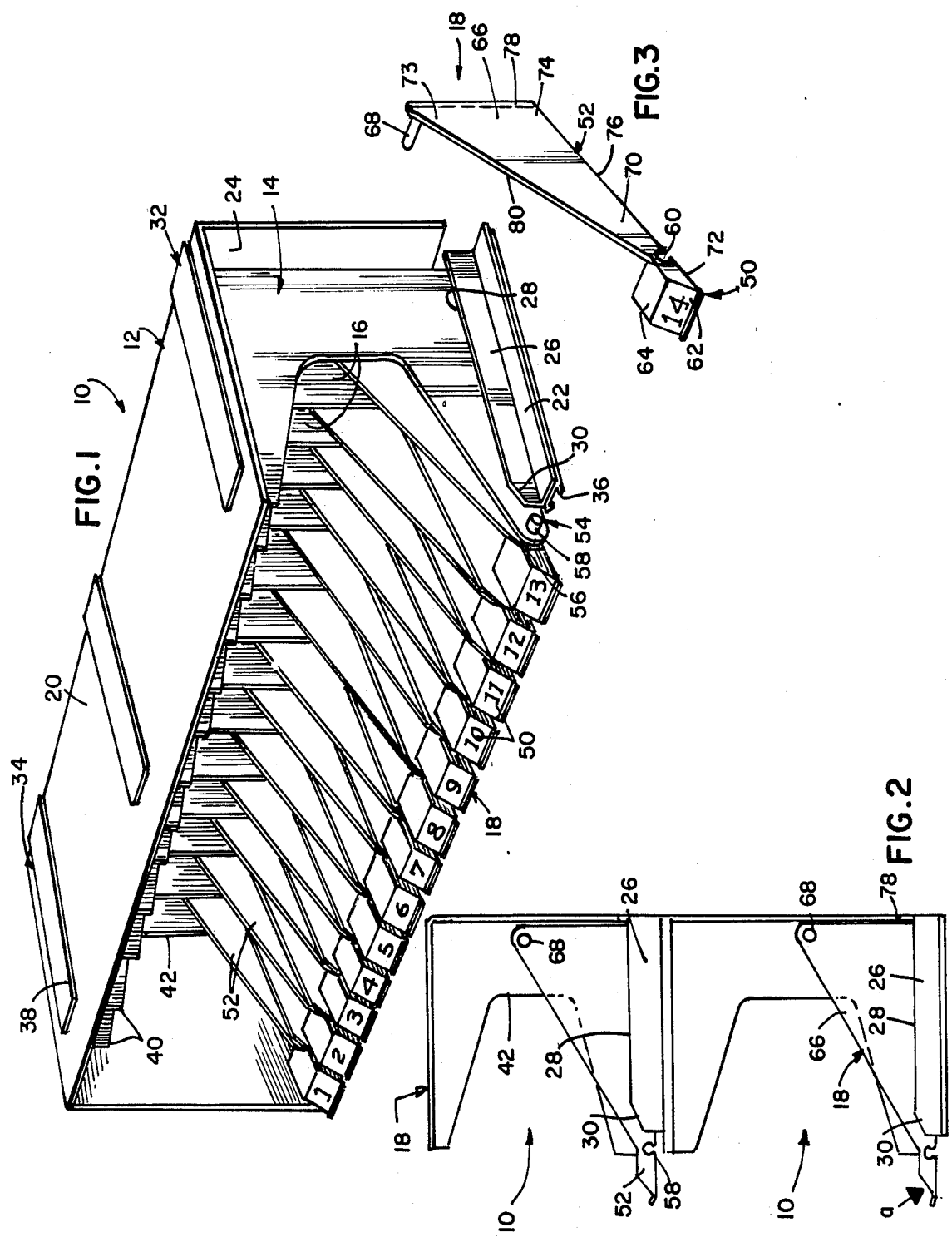

CELL WITH PUSH BUTTON EJECTOR MECHANISM

BACKGROUND OF THE INVENTION

I. Field of the Invention

This invention relates to storing and dispensing systems in general and more specifically to a system for storing and dispensing computer media such as magnetic tape cartridges and packages containing optical disks and the like.

II. Description of the Prior Art

For years the accepted state-of-the-art means for supplying digital magnetic tape to data processors and other users was the familiar 10½ inch reel of ferric oxide magnetic tape. The development of the IBM-3480 Magnetic Tape Subsystem which utilizes a recording medium of chromium-dioxide magnetic particles on tape contained within compact easy to handle cartridges, is predicted to make the 10½ inch tape reels obsolete. Not only is the chromium-dioxide magnetic tape technologically better than ferric oxide tape, but being stored in specially design cartridges which are about 4 inches by 5 inches in size compared with the 10½ inch reels has resulted in substantial space savings to users.

Libraries for tape cartridges are available in the form of conventional stationary pigeon hole stacks into which individual cartridges are slid and then removed for usage. Portable carts with pigeon holes are also available to transport a number of cartridges from the stacks to the data processing equipment. Desk racks and cabinets located in the processing area store currently used "Work-In-Process" cartridges.

Computer media libraries place specialized demands on storing and dispensing systems. For example, extremely high storage densities are needed for larger libraries so as to maximize floor space utilization. Furthermore, the system must be adaptable to the physical indexing of stored cartridges in which each cartridge is assigned an identifying indicia which should also be visible at its storage location. Additionally, the storing and dispensing system should facilitate operation of the media library by providing for the efficient selection and removal of desired cartridges.

Various storage and dispensing systems incorporating an ejector mechanism to assist in removal of stored articles have been suggested in the prior art.

U.S. Pat. No. 3,866,990 to McRae, teaches a storage and dispensing cabinet for audio tape cassettes incorporating an ejector having many separate parts. It comprises a plurality of slideways, a plurality of elongated key levers pivotally mounted above the slideways and having exposed front portions, and a plurality of L-shaped ejector cranks pivotally mounted adjacent the inner ends of the key levers. The key levers actuate the ejector cranks to push a selected cassette forwardly along the slideways when the front portions are depressed.

U.S. Pat. No. 3,969,007 to Lowry, teaches an audio cassette dispenser including a plurality of cassette accommodating compartments and a comb-like key release member which bends with a hinging action at two joints upon actuation, to urge a selected cassette from the dispenser. The durability and life expectancy over repeated use of the hinged release member may be undesirably limited.

U.S. Pat. No. 4,087,138 to McRae, teaches a storage and dispensing cabinet including a housing forming a plurality of slots and an ejector. The ejector includes a rocker positioned below the floor of each slot, an arm that upwardly extends along the back of the cassette stored therein, a retainer which projects upwardly in front of the cassette, and a manual actuator. By depressing the actuator, the rocker is flexed so as to move the retainer down, and the arm (which remains unflexed) pushes the cassette out of the front of the slot.

U.S. Pat. No. 4,121,877 to Brown, teaches a magnetic tape cassette storage case comprising a container for receiving boxed cassettes in side by side arrangement on blocks disposed on the bottom of the container, and a keyboard having a plurality of levers for elevating selectively and individually the boxes through an open mouth of the container. The keyboard includes a plurality of pivotally mounted levers extending under the boxes in the spaces defined between the blocks and the bottom of the container. On depressing one of the keys, the lever pivots about its intermediate portion to cause the selected cassette box to be elevated above the remaining boxes and thereby permit the user to grasp it in a convenient manner and remove it from the case.

U.S. Pat. No. 4,270,817 to McRae, teaches a storage and dispensing cabinet for articles such as tape and film cassettes comprising a housing forming a plurality of article receiving slots, retention members and an ejector for retaining the articles in the slots and for selectively ejecting one upon actuation. The ejector includes a spring finger in each slot which is resiliently depressed during storage of the article, and springs forward on actuation to partially eject the article. In one embodiment, the articles are stored on end and, in another, on their sides.

While many of the patents described hereinabove may find utility for one or another application with respect to a particular type of cassette or other article, desirable is an improved system for storing and dispensing computer media and specifically one adapted to the specialized needs of high density storage and efficient operation of a computer media library. Even more specifically, desirable is an improved system specifically dedicated to the specialized needs associated with the computer magnetic media cartridge.

Accordingly, an object of the present invention is to provide an improved system for storing and dispensing computer media and specifically computer magnetic media stored on cartridges.

Another object of the present invention is to provide a system for storing and dispensing computer media that permits high density storage in such a manner as to promote the efficient operation of a computer media library.

Still a further object of the present invention is to provide a storing and dispensing system for magnetic tape cassettes and other computer media which is relatively simple in design, and is easily fabricated and assembled.

A still further object of the present invention is to provide a storing and dispensing system of all plastic modular construction which permits the stacking of one dispenser above another so as to achieve a flexible and versatile storing and dispensing system.

SUMMARY OF THE INVENTION

These and other objects of the invention are achieved in a storing and dispensing system comprising a housing forming a plurality of stalls in which is disposed a onepiece ejector. The ejector has a key pivotally mounted at the open end of each of the stalls and, at the ejector's other end a driving pin disposed transversely across the rear of the stall. A lever arm connects the key to the transverse pin. Each stall further includes a rib on which a cartridge rests on end while stored therein.

In operation, the cartridge is manually inserted into a stall. On dispensing, the key is depressed which causes the ejector to pivot about the front of the stall and drive the transverse pin with an arcuate motion to the front, propelling the cartridge to a forward position in which it can be easily grasped and removed from the housing.

The above and other features of the invention, including various novel details of construction and combination of parts, will now be described with reference to the accompanying drawings and pointed out in the claims. It will be understood that the particular storing and dispensing system embodying the invention is shown and described by way of illustration only and not as a limitation. The principles and features of this invention may be employed in varied and numerous embodiments without departing from the scope of the invention.

DESCRIPTION OF THE DRAWINGS

FIG. 1 is a perspective view of a computer media storing and dispensing system showing the housing with a near sidewall removed, and ejector in accordance with a first embodiment of this invention;

FIG. 2 is a side view of two housings in accordance with the first embodiment of this invention, stacked one upon the other;

FIG. 3 is a perspective view of the ejector of FIG. 1;

DETAILED DESCRIPTION OF THE INVENTION

Figure 4:
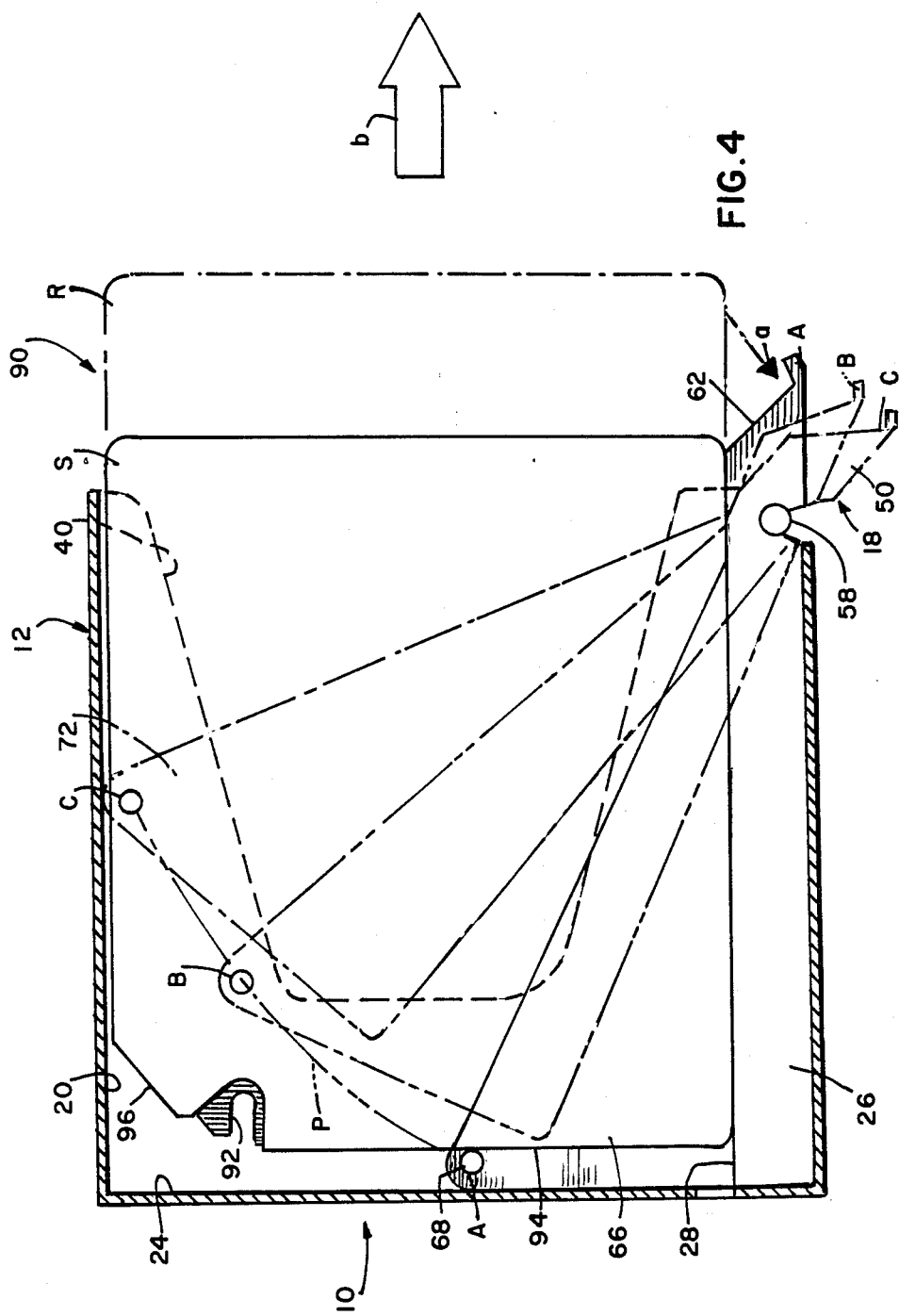
FIG. 4 is a side elevational view of the system of FIG. 1, containing a computer tape cartridge and illustrating its operation.

Referring now to the drawings, and more particularly to FIG. 1 thereof, a storing and dispensing system 10 for computer media essentially consists of a housing or enclosure 12 and partition means 14 for dividing said housing 12 into a plurality of parallel stalls or compartments 16 for storing computer media. Associated with each stall 16 is an ejector 18 pivotally mounted on the housing 12 for dispensing the contents of the associated stall 16 upon manually actuation thereof.

The housing 12 includes substantially parallel top and bottom walls in spaced relation, designated 20 and 22, respectively, a rear wall 24 extending perpendicular to the top and bottom walls 20, 22 and bridging between them, and an open front end. A fin or rib 26 upwardly extends from bottom wall 22 into each stall 16, midway between the partition means 14 forming the stall 16, culminating distally with a thin edge 28 defining a slideway extending from the open front to the rear wall 24 of the housing 12. The thin edge 28 is on the order of 0.09 inches (0.2 cm) wide. The rib 26 includes a chamfered lead-in portion 30 adjacent the front opening of the housing and smoothly joining with the thin edge 28. Means 32 for fastening the housing 12 to a support structure (not shown) or to another housing of similar configuration in stacked arrangement, as shown in FIG. 2, preferably includes dove-tailed projections 34 and mating dove-tailed recesses 36, disposed on at least one of the top, bottom and rear walls 20, 22, 24. As shown, a mating recess 36 is disposed on the exterior of the bottom wall 22 of the housing 12 (others not being visible due to the perspective of the view), and a plurality of dove-tailed projections 34 are disposed in spaced, parallel relation along the exterior of the top wall 20 at locations suitable to permit the interfitting of each dove-tailed projection into a mating recess. The dove-tailed projections 34 each have an elongate, planar, outer surface 38 extending from the rear wall 24 and towards, nearly to, the open end of the housing 12, and a cross-sectional dove-tail configuration, similar to and sized to be received within mating recess 36.

The partition means 14 preferably comprises a plurality of thin walled, generally C-shaped partitions or dividers 40. The dividers 40 are concave in profile, having a straight edged cut-out 42 opening towards the open end of the housing 12. Each divider 40 forms a side wall of two adjacent stalls 16, except for the divider 40 at each end of the housing 12 which forms a side wall for the end stall 16 and for the housing 12 itself.

Preferably, the housing 12 and partition means 14 are of unitary construction, being integrally molded from a plastic material.

The ejector 18 includes a key 50 connected to a crank 52. The ejector 18 is supported by the housing 12 for pivotal movement within the associated stall 16. More specifically, attachment means 54 is provided to pivotally secure the ejector 18 near bottom wall 22 to a free end 56 of an associated one of the dividers 40 forming the stall 16. The associated divider 40 is provided with a pivot pin 58 projecting perpendicularly therefrom and transversely across the stall 16 towards, though not necessarily to, an opposite associated divider 40.

The pivot pin 58 is received within a journal portion of the key 50 at a location near the joint of the key 50 to the crank 52. At this location, as can be seen in FIG. 3, a key-shaped slot 60 is provided. The slot 60 removably snap-fits over the pivot pin 58. The attachment means 54 forms the fulcrum about which the ejector 18 pivots. Preferably, the key 50 supported by the attachment means 54 is cantilevered through the open end of the housing 12. The pivot pin 58 and divider 40 are preferably of integral construction with the former being a stub shaft. Alternatively, the pivot pin 18 can be in the form of the rod extending through the dividers 40 from one end of the housing 12 to the other.

With additional reference to FIG. 3 the ejector 18 according to one embodiment of the invention will now be more fully and specifically described.

The key 50 includes an inclined front surface 62 on which can be placed a label or other identifying indicia, and a top surface 64 which is disposed at a height below the rib's edge 28 and above the lower extent of the lead-in edge 30.

The crank 52 includes a planar, triangularly shaped lever arm 66 and a transverse member or pin 68. The key 50 is connected to one corner 70 of the lever arm 66 such that a side surface 72 of the key 50 is coplanar with the lever arm 66 and the rest of the key 50 extends on a first side of and generally perpendicular to said plane. The transverse pin 68 projects from a second corner 73 of and perpendicularly from the lever arm 66 on the first side thereof, to a distance equal to or less than the extent of the key 50 in that direction. The lever arm 66 is in the form of a right triangle, having its right angle in the third corner 74. Connecting the first and third corners 70, 74 is a bottom edge 76; connecting the second and third corners 73, 74 is a rear edge 78; and connecting the first and second corners 70, 73 is the hypotenuse or third edge 80.

Preferably the ejector 18 essentially consists of the crank 52 and the key 50, and is of a unitary construction integrally molded of plastic material. The crank 52 preferably essentially consists of the lever arm 66 and the transverse pin 68.

Assembly and orientation of the system 10, and particularly the ejector 18 within housing 12, can be appreciated from FIG.'s 1-3. After ejector 18 is snap-fitted over pivot pin 58, lever arm 66 is disposed adjacent to and contacting or nearingly contacting the associated divider 40, in substantially parallel relation therewith with bottom edge 76 contacting bottom wall 22 of the housing 12 between the associated divider 40 and rib 26, and rear edge 78 disposed adjacent and substantially parallel to rear wall 24. The transverse pin 68 is disposed approximately midway between the top and bottom walls 20, 22 of the housing 12. Key 50 and transverse pin 68 extend substantially across the width of the stall 16; width being measured from one associated divider 40 to the other. Pivoting of the ejector 18 is accomplished by manually depressing the key 52, as indicated by arrow "a".

Operation of the storing and dispensing system for computer media in accordance with the invention can be appreciated with reference to FIG. 4.

Computer media includes the tape cartridge discussed hereinabove in the "Background of the Invention", as well as rectangular or square packages of optical discs, magnetic tape reels or film. In fact, computer media can be understood in a broader sense to encompass all media used today, in this the computer age. For convenience in nomenclature all such media shall be referred to as cartridges.

FIG. 4 illustrates the use of the system 10 with a cartridge designated 90. Removal of the cartridge 90 in the direction of arrow "b" shall now be described.

With the cartridge 90 in its stored position, identified as POSITION "S", the ejector 18 is oriented such that the key 50 and transverse pin 68 are in POSITION A. In this position the ejector 18 is disposed and oriented as described hereinabove with regard to the assembly of the system 10. The cartridge 90 is disposed against the transverse pin 68. A line (not shown) drawn between the pivot pin 58 and the transverse pin 68 forms an angle of approximately 32 degrees with respect to the rib's thin edge 28.

In the orientation shown, the cartridge 90 is stored on end, resting on the slideway defined by the rib's edge 28. The function of the thin edge 28 is to reduce drag on the cartridge 90 as it is slid along the slideway, compared to what would be experienced were the cartridge 90 to rest on the broad flat portion of the bottom wall 22 (FIG. 1) located on the floor of the stall 16. The thinness of the edge 28 tends to lessen the amount of dust which can settle on the slideway.

The invention can be practiced in other orientations of the housing 12. For example, the housing 12 can provide top discharge by being oriented such that the cartridge 90 rests on the transverse pin 68. Alternatively, the housing 12 can be turned upside down, with key 50 disposed above the cartridge 90. In this case, the rib 26 should be located on the interior of the wall of the housing 12 which supports the weight of the cartridge 90. Of course, the cartridge 90 can also be discharged at an intermediate angle, such as 45°, by appropriate tilting of the housing 12. Another orientation is achieved by turning the housing 12 so that the cartridge 90 rests on one of the associated dividers 40. All of these orientations can be appreciated by one skilled in the art from this description taken in light of the FIG.'s 1-4.

Continuing with an explanation of the operation of system 10 with renewed reference to FIG. 4, the key 50 is manually depressed in the direction indicated by arrow "a" for actuation of the ejector 18. The key 50 and transverse pin 68 move into POSITION B, in so doing displacing cartridge 90 partially from said housing 12 through its open front end until it reaches its reference position, designated "R". Transverse pin 68 moves to POSITION B along an arcuate path designated "p" and directed towards the top wall 20 and open front end of the housing 12. The lever arm 66 concurrently slides next to the cartridge 90, between it and divider 40.

To more fully appreciate POSITION "B", a short digression in the description is needed. In accordance with the invention, the cartridge 90 preferably has a transverse recess 92 along a longitudinal edge 94 thereof, which edge is adjacent the rear wall 24 of the housing 12. Tape cartridges used in the IBM 3480 System typically include the transverse recess 92 adjacent a beveled corner 96 which facilitates proper orientation of the cartridge for placement in the housing 12, that is, with the transverse recess 92 near the top of the cartridge 90.

In POSITION B, the transverse pin 68 is partially received within the transverse recess 92. Because of the interrelationship of ejector 18, cartridge 90 and housing 12 the ejector 18 is latched into this position, with the transverse recess 92 serving as a catch to retain the transverse pin 68. The pin is of sufficient strength to support the weight of the cartridge 90 in the top discharge orientation of the housing 12. Furthermore, a sudden increase in the force required to depress key 50 further occurs at this position, and therefore a positive action in needed to move beyond the reference position. This is advantageous, for example, in large media libraries. In such libraries, individuals may be asked to select cartridges and discharge them to the reference position. A librarian or operator can then certify the selection prior to removal of the cartridge. This can save time and avoid undesirable removal of incorrect cartridges.

In POSITION B, a line (not shown) connecting the pivot pin 58 to transverse pin 68 forms an angle of approximately 45 degrees with respect to the rib's edge 28.

Upon further manual depression of key 50, transverse pin 68 leaves transverse recess 92. On obtaining POSITION C of transverse pin 68 and key 50, the cartridge is more fully discharged from the housing 12, and can be easily manually grabbed and removed since it extends far out of the open end of the housing 12, and the "C" shaped dividers 40 (FIG. 1) are conducive to the cartridge 90 being easily manipulated.

In POSITION C, the corner 72 of the lever arm 66 engages the interior of the top wall 20. Together they form means to limit further pivoting of the transverse pin along arcuate path "p" and, thus, limit the extent of displacement of the cartridge 90 from the housing 12.

Further, in POSITION C, a line (not shown) connecting pivot pin 58 to transverse pin 68 forms an angle of approximately 60 degrees with respect to the rib's edge 28.

The extent of discharge at POSITION B and POSITION C or, in other words, the relative locations of the REFERENCE POSITION and the position of engagement of top wall 20 by corner 72, can be changed by one skilled in the art by changing the angle formed by the line connecting pivot pin 58 and transverse pin 68. Of course, as will be quickly understood by one skilled in the art, the length of this line helps determine the mechanical advantage of the ejector 18 since it forms a true "lever arm" as that term is used in engineering mechanics.

After the cartridge 90 has been removed, the ejector 18, in the orientation of the housing 12 shown in the drawings, pivots back to rest on the bottom wall 22 due to gravity.

For insertion of the cartridge 90 into the housing 12, the cartridge 90 is oriented so that beveled corner 96 is adjacent top wall 20. The cartridge 90 is then slid along the slideway formed by rib 26, with initial insertion facilitated by lead-in portion 30 (FIG. 1). For orientations of the housing 12 other than as shown in the drawings, the cartridge 90 itself drives transverse pin 68 pivotally along arcuate path "p" to POSITION A. When cartridge 90 is fully received within housing 18, it is disposed such that inclined surface 62 of the key 50 extends beyond its leading edge.

A second embodiment of the invention shall now be described with reference to FIGS. 5–9.

Figure 5:
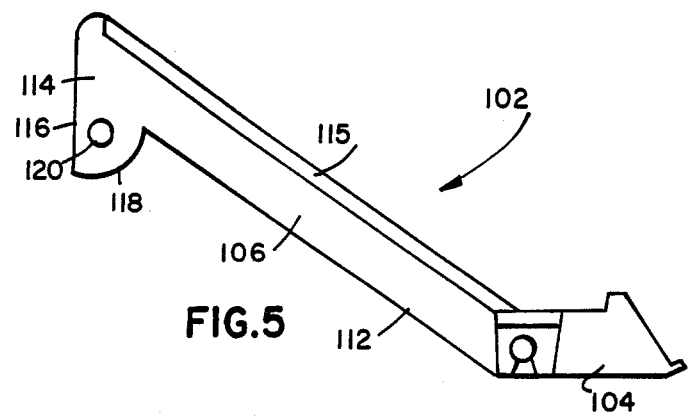
FIG. 5 is a side elevational view of an ejector in accordance with a second embodiment of the invention.
Figure 6:
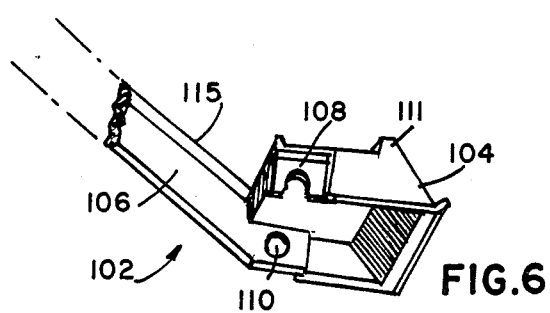
FIG. 6 is a partial perspective view of the ejector of FIG. 5.

FIGS. 5 and 6 show an alternative design for an ejector made in accordance with the invention. The ejector 102 includes a key 104 connected at one of its sides to a crank 106.

The key 104 is of a design similar to key 50 except that instead of having two key-shaped slots on opposite sides thereof, it has only one, identified by reference numeral 108. On the other side of the key 104, a normal round hole 110 is provided.

The key has a raised lateral ridge towards its front forming a retention lip 111, as shall be more fully described hereinbelow.

The crank 106 has a generally "L" shaped configuration comprising an elongate, flat, rectangular neck portion 112 connecting at one of its ends to and extending from the key 104, and forming an angle of approximately 30 degrees with respect thereto, and a flat head portion 114 coplanar with respect to and connected at the other end of the neck portion 112. The neck portion 112 includes a beveled edge 115. The crank head portion 114 culminates at the free end of crank 106 with a vertical surface 116, forming an included angle of approximately 30° with respect to the neck portion 112. Projecting downwardly, a portuberance 118 formed in the lower portion of the head portion 114 supports a transverse pin 120, which projects transversely therefrom.

Preferably the ejector 102 essentially consists of the key 104 and the crank 106, and is of a unitary construction integrally molded of plastic material. The crank 106 preferably essentially consists of the neck portion 112, the head portion 114 and the transverse pin 120. The neck and head portions 112, 114 comprise a lever arm.

Figure 7:
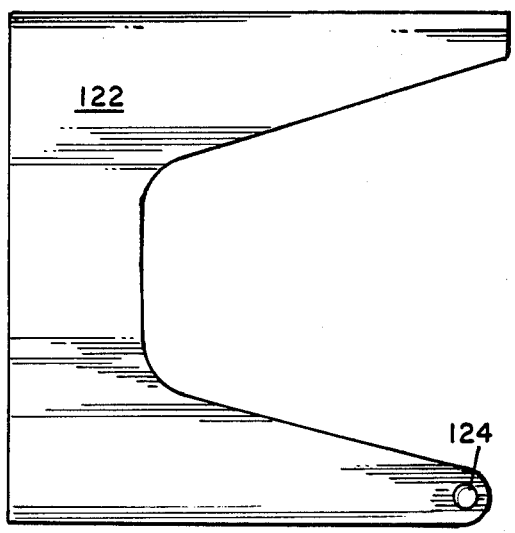
FIGS. 7 and 8 are side and front elevational views, respectively, of dividers made in accordance with the second embodiment of this invention, with an ejector in accordance therewith shown in phantom in FIG. 8.
Figure 8:
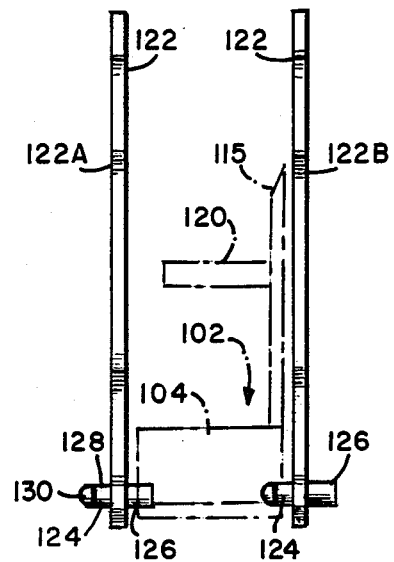

FIGS. 7 and 8 show dividers 122 similar in design to dividers 40 except with respect to the pivot pin. Between the dividers 122, and shown in phantom, is the ejector 102. In accordance with this embodiment of the invention, aligned first and second pivot pin portions 124, 126 extend outwardly from opposite sides of each of the dividers 122. First pivot pin portion 124 is in the form of a right cylinder, having a groove 128 and a rounded bulb 130.

In FIG. 8 two of the dividers 122A, 122B are shown for illustrative purposes. They are in spaced parallel relation for receiving one of the ejectors 102 therebetween. The first pivot pin portion 124 of divider 122B opposes and is axially aligned with and spaced from the second pivot pin portion 126 of divider 122A.

During assembly, and with reference to FIG's 5–8, the ejector 102 is placed between dividers 122A and 122B with the beveled edge 115 adjacent divider 122B. The second pivot pin portion 126 of divider 122B is received within hole 110, and then the key 104 is slid down in such manner that the pivot pin portion 124 of divider 122A is received within key-shaped slot 108. Preferably, the diameter of pivot pin portion 124 is sized so as to enter the rounded portion of the slot 108 with a snap fit. The bulb portion 130 of the first pivot pin portion 124 aids in assembly since it permits tilting of the ejector 102 to allow it to be pushed over the first pivot pin portion 124 of divider 122A.

Figure 9:
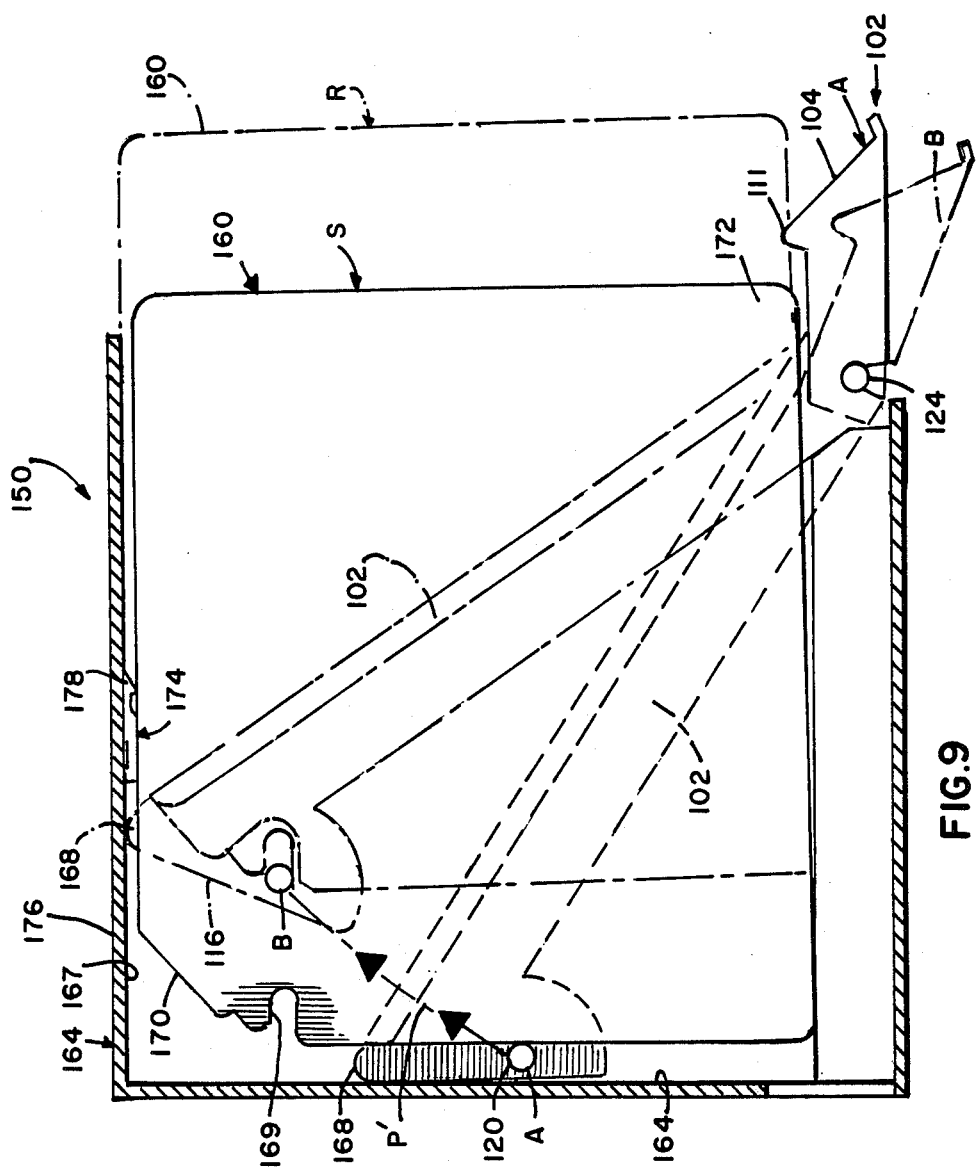
FIG. 9 is a side elevational view of a computer media storing and dispensing system in accordance with the second embodiment of this invention.

FIG. 9 illustrates the operation of the system 150 in accordance with this embodiment of the invention, together with showing other novel features of the design.

The operation of the system 150 is similar in many respects to that of system 10 shown in FIG. 4. Its operation during dispensing shall now be described.

In FIG. 9, ejector 102 is shown as movable between positions designated "A" and "B", corresponding respectively to the stored POSITION S and discharge or reference POSITION R of cartridge 160, as the key 104 is depressed.

The ejector 102 is pivotedly mounted on first and second pivot pin portions, of which portion 124 is shown.

In POSITION A the ejector 102 rests against rear wall 162 of enclosure 164, with vertical surface 116 bearing against it. As ejector 102 swings toward the reference position R, the track of the transverse pin 124 follows an arcuate path indicated at p'. The displacement of the ejector 102 along path p' is limited at its upper extent by contact between the rounded top 168 of the ejector 102 and the top wall 176 of the enclosure 164. At this limit, the ejector 102 is in POSITION B and the transverse pin 124 has driven the cartridge 160 to its POSITION R. From this position the cartridge 160 is easily grasped and removed.

Note that unlike the system 10 shown in FIG. 4, only two positions of the ejector are shown. POSITION B for ejector 102 exhibits the advantages of POSITION B as well as POSITION C for ejector 18 in FIG. 4. If the enclosure 164 is used in a vertical orientation, with the front opening upwardly, the cartridge 160 in its POSITION R (corresponding to POSITION B of the ejector 102), will remain in that position despite gravity, until it is manually pushed back into the enclosure 164. This is accomplished through the interfit of transverse pin 24 with the transverse recess 169 of cartridge 160, as can be more fully understood with reference to the description of FIG. 4.

During insertion of the cartridge 160 in the enclosure 164, it is pushed inwardly, driving the key 104 to pivot downwardly so that the leading edge of the cartridge 160 clears the upstanding abutment lip 111. The beveled edge 115 helps prevent catching of the cartridge 160 on the ejector 102 prior to its engagement with the transverse pin 120 at the rear of the enclosure 164.

The abutment lip 111 helps prevent the cartridge 160 from accidentally falling out of the enclosure 164, and thus forms releasable means for retaining the article in the housing during storage thereof. When the key 104 is actuated both the key 104 and the integral abutment lip 111 move down and permit the dispensing of the cartridge 160.

Since the enclosure 164 is slightly larger than the cartridge 160, it was found that, during ejection when the enclosure was used in a horizontal orientation opening sideways, the cartridge 160 tended to rotate with its beveled edge 170 tilting upwardly. On occasion, this resulted in the bottom front corner 172 getting trapped behind the abutment lip 111, and thereby inhibiting dispensing of the cartridge 160. To help prevent this, a retention projection or bump 174 protrudes from the top wall 167 of the enclosure 164 and into its interior a short distance sufficient to limit rotation or tilting of the cartridge 160 during dispensing. A lead-in edge 178 of the bump 174 helps prevent the cartridge 160 from getting caught on the bump 174 during insertion. Preferably, the bump 174 contacts the cartridge 160 even when it is in its stored position, POSITION S, maintaining it at a slight angle of under five degrees.

The invention may be embodied in other specific forms without departing from the spirit or essential characteristics thereof. The described embodiment is therefore to be considered in all respects as illustrative and not restrictive, the scope of the invention being indicated by the appended claims rather than by the foregoing description, and all changes that come within the meaning and range of equivalency of the claims are consequently intended to be embraced therein.

What is claimed is:

1. A system for storing and dispensing media cartridges comprising:

a housing having an open front and comprising a top wall, a bottom wall, a rear wall and a pair of end walls; a plurality of spaced apart partitions each extending from front to rear and from top to bottom in the housing to form a plurality of stalls for storing media cartridges;

a cartridge ejector associated with each stall; the cartridge ejector pivotally mounted at the open front of the housing and including a non-supporting crank portion extending front to rear within the housing; the cartridge ejector further including a key at the front of the crank for actuating the crank and a transverse member with respect to the stall attached at the rear of the crank; the crank further characterized by being pivotally mounted near the bottom of its respective stall and the transverse member being located near the top of the stall whereby the crank is sloped upwardly from front to rear; and, a rib affixed to the bottom wall of each stall for supporting a media cartridge, the rib extending substantially from front to rear in each stall and approximately parallel to the crank arm whereby as the crank arm is actuated a media cartridge which may be supported on the ribe is smoothly pushed toward the open front of the housing.

2. The system recited in claim 1 further including a retention projection mounted on the top wall of the housing in each stall whereby as a cartridge is ejected, upward movement of the cartridge is limited.

3. The system recited in claim 1 wherein there is at least one pin projecting transversely with respect to each stall from at least one of the partitions and wherein the ejector includes a slot for accepting the pin whereby the ejector may be pivotally mounted within the stall.

* * * * *